United States Patent
Koshikawa

(10) Patent No.: US 7,528,863 B2
(45) Date of Patent: May 5, 2009

(54) REMOTE-CONTROL DEVICE FOR DIGITAL CAMERA

(75) Inventor: Naoki Koshikawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 745 days.

(21) Appl. No.: 11/036,996

(22) Filed: Jan. 19, 2005

(65) Prior Publication Data
US 2005/0162525 A1    Jul. 28, 2005

(30) Foreign Application Priority Data
Jan. 23, 2004    (JP)    ............... P2004-015076

(51) Int. Cl.
H04N 5/232    (2006.01)
H04N 5/228    (2006.01)

(52) U.S. Cl. .................. 348/211.4; 348/222.1

(58) Field of Classification Search ............... 348/211.99–211.14, 333.01–333.13, 229.1
See application file for complete search history.

(56) References Cited

U.S. PATENT DOCUMENTS

| | | | | |
|---|---|---|---|---|
| 4,571,051 A | * | 2/1986 | Kazami | 396/279 |
| 6,798,456 B1 | * | 9/2004 | Sato | 348/362 |
| 6,930,718 B2 | * | 8/2005 | Parulski et al. | 348/333.11 |
| 7,019,777 B2 | * | 3/2006 | Sun | 348/263 |
| 7,142,723 B2 | * | 11/2006 | Kang et al. | 382/254 |
| 7,301,566 B2 | * | 11/2007 | Nakami et al. | 348/222.1 |
| 2003/0043292 A1 | * | 3/2003 | Pyle et al. | 348/364 |
| 2004/0150724 A1 | * | 8/2004 | Nozaki et al. | 348/211.4 |

FOREIGN PATENT DOCUMENTS

JP    2002-094867    3/2002

OTHER PUBLICATIONS

U.S. Appl. No. 11/035,963 to Koshikawa, filed Jan. 18, 2005.

* cited by examiner

Primary Examiner—David L Ometz
Assistant Examiner—Pritham Prabhakher
(74) Attorney, Agent, or Firm—Greenblum & Bernstein, P.L.C.

(57) ABSTRACT

A remote-control device controls a digital camera, in which a first range of an exposure compensation value, which can be set when independently using the digital camera, is narrower than a potential range of the exposure compensation value, which is possible to set in the digital camera. The remote-control device sets the exposure compensation values within a range which is broader than the first range. The remote-control device makes the digital camera perform a shutter release operation, in accordance with the exposure compensation values.

7 Claims, 4 Drawing Sheets

REMOTE-CONTROL DEVICE FOR DIGITAL CAMERA

BACKGROUND OF THE INVENTION

1. Field of the Invention

The present invention relates to a remote-control device for a digital camera, in which the remote control is performed by a personal computer.

2. Description of the Related Art

Conventionally, a system for the remote-control of a digital camera through a personal computer, has been proposed as described in Japanese Unexamined Patent Publication No. 2002-94867. Further, there is known a digital camera, which can carry out a bracket exposure in a similar way as a silver-halide film camera, and the bracket exposure can be remote-controlled through a personal computer.

In a digital camera, a range of the exposure compensation is potentially ±8 Ev, for example. However, the range of the exposure compensation, which is actually used in the bracket exposure, is limited to ±3 Ev or ±2 Ev. This is due to the structure of the operation member for selecting the bracket exposure mode, or an indicating function of the display device, and so on.

On the other hand, the latitude of the imaging device (or CCD) provided in a digital camera is narrower than a silver-halide film. Therefore, if the exposure compensation values are too low in the bracket exposure, the exposure compensation may not be properly performed.

SUMMARY OF THE INVENTION

Therefore, an object of the present invention is to provide a remote-control device for a digital camera, in which the exposure compensation values can be set in a sufficiently wide range, when remote-controlled through a personal computer.

According to the present invention, there is provided a remote-device for remote-control of a digital camera. In the digital camera, a first range of an exposure compensation value, which can be set when independently using the digital camera, is narrower than a potential range of the exposure compensation value, which can be potentially set in the digital camera. The remote-control device comprises a first generating processor, a second generating processor, and a transmitting processor.

The first generating processor generates an exposure compensation value setting command for setting the exposure compensation value to a second range, broader than the first range. The second generating processor generates a shutter release command for performing a shutter release operation of the digital camera. The transmitting processor transmits the exposure compensation value setting command and the shutter release command.

Further, according to the present invention, there is provided a remote-control system for a digital camera, comprising a digital camera, a first generating processor, second generating processor, and a transmitting processor.

In a digital camera, a first range of an exposure compensation value, which can be set when independently using the digital camera, is narrower than a potential range of the exposure compensation value, which can be potentially set in the digital camera. The first generating processor is provided in a computer, separate from the digital camera, to generate an exposure compensation value setting command for setting the exposure compensation value to a second range, broader than the first range. The second generating processor is provided in the computer to generate a shutter release command for performing a shutter release operation of the digital camera. The transmitting processor is provided in the computer to transmit the exposure compensation value setting command and the shutter release command.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
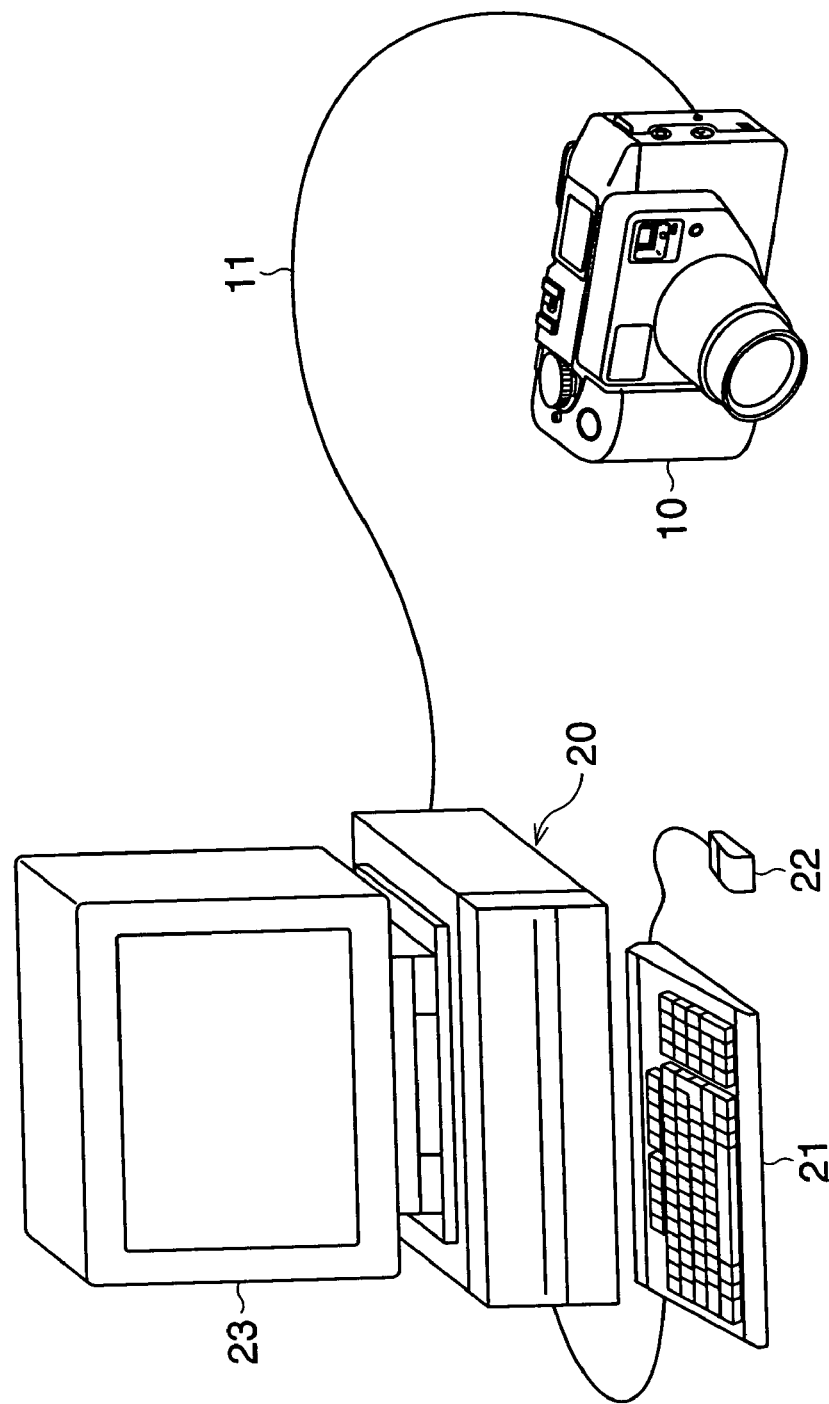
FIG. 1 is a perspective view showing a state, in which a digital camera is connected to a remote-control device (or a personal computer) which is an embodiment of the present invention.

The present invention will be described below with reference to the embodiment shown in the drawings.

FIG. 1 shows a remote-control system of a digital camera to which an embodiment of the present invention is applied. In this remote-control system, the digital camera 10 is connected to the personal computer 20 through a cable 11. The digital camera 10 can be used individually or separately, and when connected to the personal computer 20, the digital camera 10 can be remote-controlled through the personal computer 20. In the personal computer 20, a control data for the digital camera 10 is input through a keyboard 21 and a mouse 22, and is indicated by a display 23.

Figure 2:
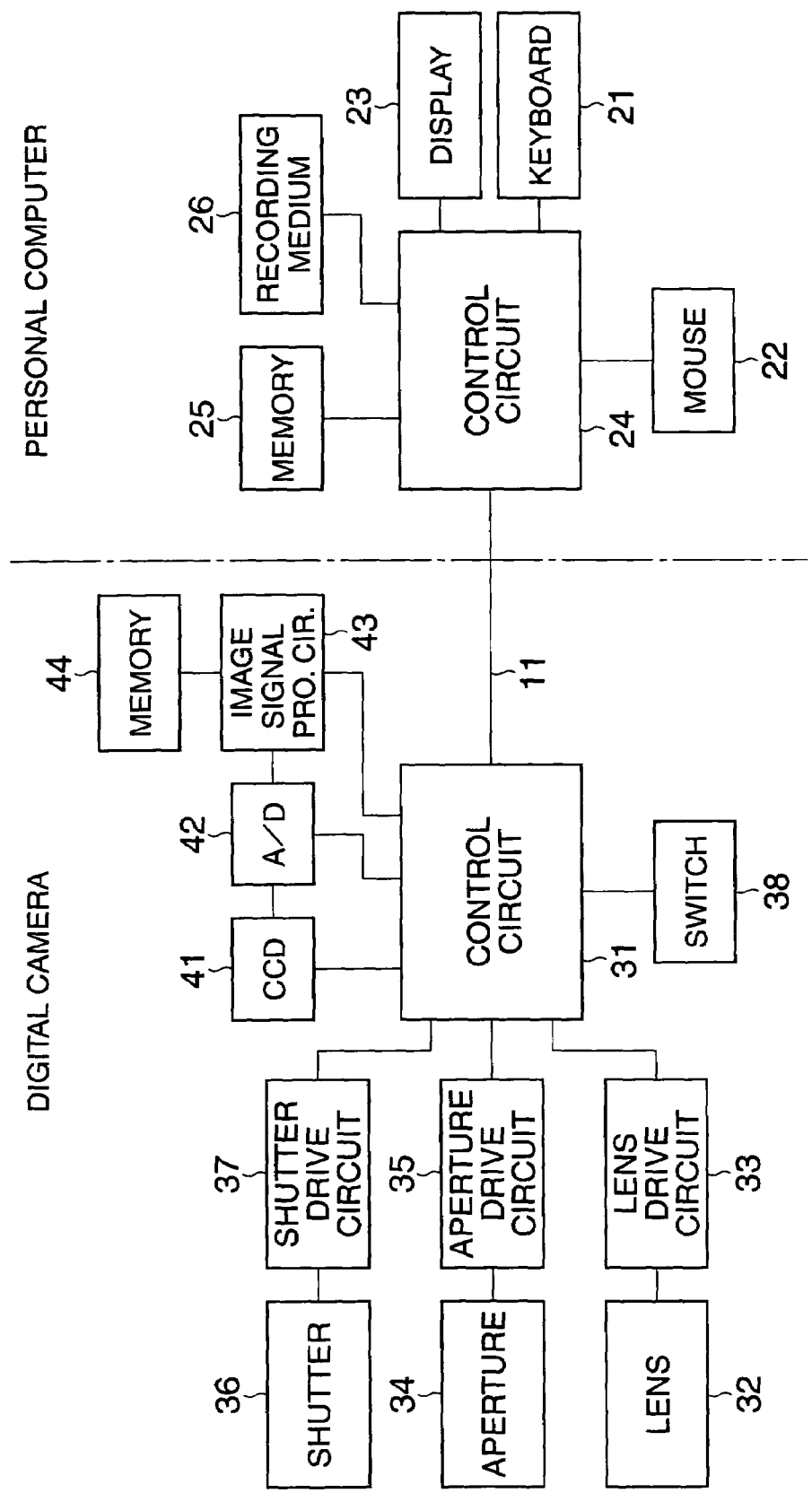
FIG. 2 is a block diagram generally showing an electric construction of the digital camera and the personal computer.

FIG. 2 is a block diagram generally showing an electric construction of the digital camera 10 and the personal computer 20. In the personal computer 20, the keyboard 21, the mouse 22, the display 23, a memory 25, and a recording medium 26 such as removable PC-card, CD-ROM, DVD, or hard disk are connected to a control circuit 24, which contains a CPU and so on. Image data, transmitted from the digital camera 10, is temporally stored in the memory 25, and is recorded in the recording medium 26 after being subjected to predetermined processes.

In the digital camera 10, the control circuit 31 is connected to the control circuit 24 of the personal computer 20 through the cable 11. A lens drive circuit 33 for controlling a focusing operation and a zooming operation of the lens 32, an aperture drive circuit 35 for adjusting the opening degree of the aperture 34, and a shutter drive circuit 37 for opening and closing the shutter 36, are connected to the control circuit 31. Further, a switch 38 including a release switch and so on is connected to the control circuit 31.

Light passing through the lens 32, the aperture 34, and the shutter 36, is made incident on an imaging device (i.e., CCD) 41, so that a subject image is formed. An analogue image signal read out from the CCD 41 is converted to digital image data in an AD converter 42. The image data is subjected to predetermined processes in an image signal processing circuit 43, and is temporally stored in a memory 44. The CCD 41, the AD converter 42, and the image signal processing circuit 43 are controlled by the control circuit 31.

In the embodiment, as one of photographing modes, the bracket exposure can be performed by the digital camera 10. In a remote-control operation, using the personal computer 20, which is separately provided from the digital camera 10, an expanded bracket exposure can be performed as described later. Note that the expanded bracket exposure means an exposure compensation, where the range of the exposure compensation is broader than the range of an exposure compensation performed during a normal bracket exposure. Namely, while the range of the exposure compensation can be potentially set within ±8 Ev with respect to the photometry measurement value in a normal digital camera, the range of the exposure compensation value when the digital camera is independently used is effectively limited to ±3 Ev or ±2 Ev, because of several reasons including the operation member for selecting the bracket function, which would become very complex if more than 3 pictures were to be taken. Conversely, in the expanded bracket exposure, the exposure compensation value can be set within a range broader than that when the digital camera is independently used.

Figure 3:
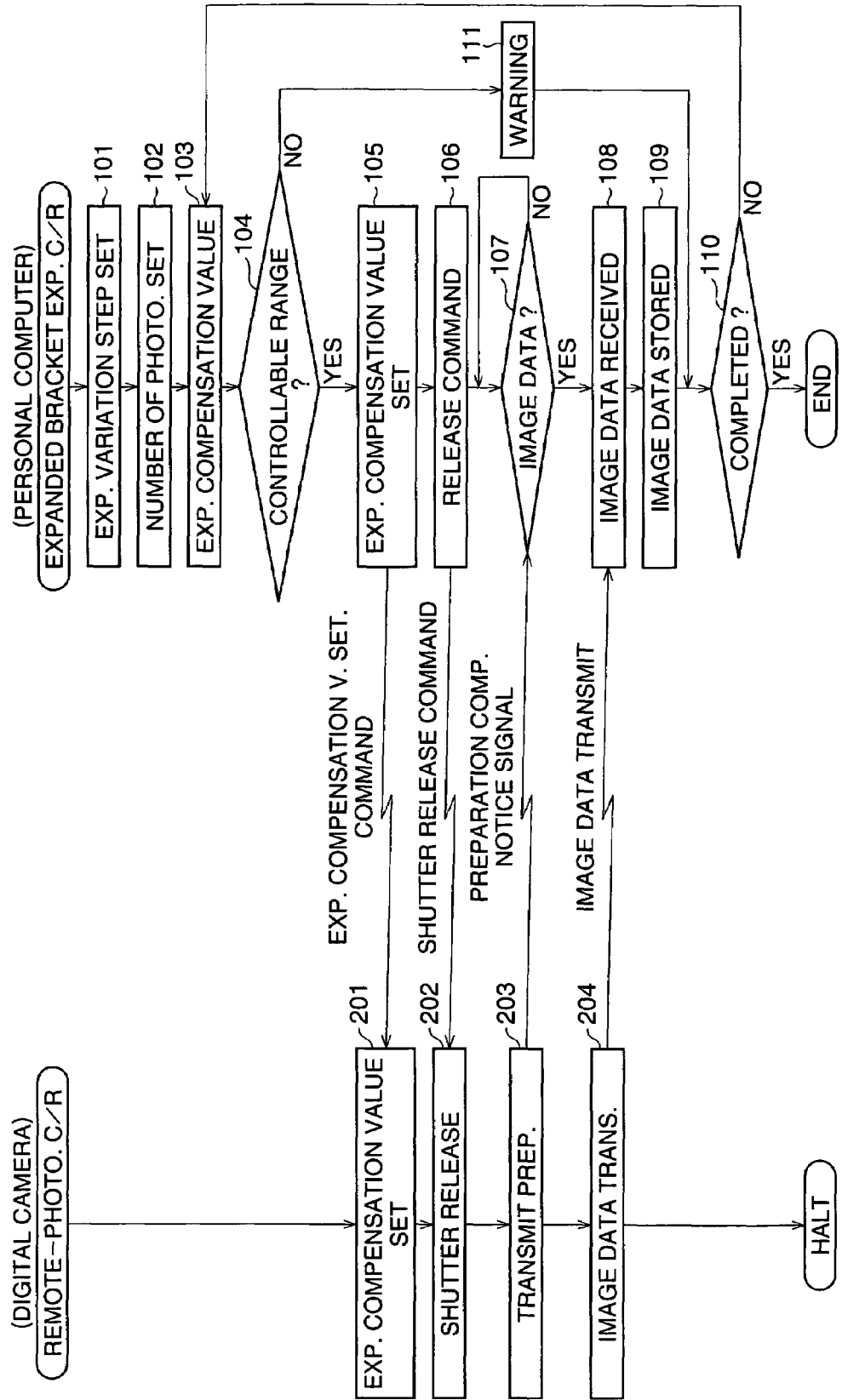
FIG. 3 is a flowchart showing a control of the bracket exposure in the digital camera and the personal computer.

With reference to FIG. 3, an expanded bracket exposure will be described below.

A program, by which the expanded bracket exposure is executed, is recorded in a recording medium, which may be the recording medium 26, or a CD-ROM, for example. The program is read from the recording medium by the personal computer 20, before performing the expanded bracket exposure.

FIG. 3 is a flowchart showing a control of a bracket exposure by the digital camera 10 and the personal computer 20. In the digital camera 10, a remote-photographing control routine is executed when the digital camera 10 is connected to the personal computer 20 through the cable 11, and in the personal computer 20, an expanded bracket exposure control routine is executed. Note that, prior to the execution of the expanded bracket exposure control routine, in the digital camera 10, a photometry operation is performed, so that Ev (i.e., Tv and Av) is obtained, and transmitted to the personal computer 20.

In the expanded bracket exposure control routine, an exposure setting step is set in Step 101, and the number of photographs is set in Step 102. The exposure setting step is the amount of variation, by which the exposure compensation value is increased or decreased for every step performed in a bracket exposure, and may be called the "exposure compensation step". The number of photographs is the number of frames, which are photographed in the bracket exposure. For example, if it is supposed that the center value of the bracket exposure is a photometry value obtained by the digital camera 10, the exposure setting step is 2.0 Ev, and the number of photographing is 9, then, the exposure compensation values are −8.0 Ev, −6.0 Ev, −4.0 Ev, −2.0 Ev, 0.0 Ev, +2.0 Ev, +4.0 Ev, +6.0 Ev, and +8.0 Ev. The exposure setting step and the number of photographs are set by inputting numbers to predetermined positions on a screen of the display 23.

In Step 103, the nine exposure compensation values described above are calculated based on the exposure setting step, the number of photographs, and the photographing order, and are indicated on the display 23. For example, when the middle value of the bracket exposure is a photometry value obtained by the digital camera 10, and the photographing is carried out in the order of the middle value, the negative compensation 1, the positive compensation 1, the negative compensation 2, the positive compensation 2, and so on, the exposure compensation value is 0.0 Ev when Step 103 is executed for the first time.

Further, in Step 103, the number of photographs which have been already taken (or the number of photographed frames) and the number of incorrect exposure compensation values (or the number of frames out of potential range) are also indicated. When Step 103 is executed for the first time, the number of photographed frames and the number of frames out of potential range are zero. Note that an example of setting an incorrect exposure compensation value is trying to set the exposure compensation value +12.0 Ev when the maximum exposure compensation value which can be set by the personal computer 20 is ±8.0 Ev, for example.

In Step 104, it is judged whether the exposure compensation value obtained in Step 103 exceeds the potential or controllable range. If the exposure compensation value exceeds the controllable range, Step 111 is executed to indicate a warning, and if the exposure compensation value does not exceed the controllable range, Step 105 is executed.

In Step 105, the exposure compensation value calculated in Step 103 is set, and is transmitted to the digital camera 10 as the exposure compensation value setting command, together with a command signal for setting the exposure compensation value in the digital camera 10. In Step 106, a shutter release command is transmitted to the digital camera 10.

In the remote-photographing control routine, when receiving the exposure compensation value setting command, Step 201 is executed, so that Tv and Av, calculated based on the exposure compensation value transmitted from the personal computer 20, are set in the shutter drive circuit 37 and aperture drive circuit 35. When receiving the shutter release command, Step 202 is executed. Namely, a shutter release operation is performed, so that the opening degree of the aperture 34 is set to the size corresponding to Av, and the shutter 36 is released for the time period corresponding to Tv.

Thus, when the photographing operation is completed, a preparation process for transmitting image data is executed in Step 203. Namely, the image data is stored in the memory 44, and a preparation completion notice signal is transmitted to the personal computer 20. In Step 204, the image data is read out from the memory 44, and is transmitted to the personal computer 20. Thus, the remote-photographing control routine returns to a waiting condition, so that Step 201 can be executed again.

On the other hand, in the personal computer 20, after the execution of Step 106, Step 107 is executed to determine whether image data can be received. When the preparation completion notice signal is received from the digital camera 10, the process goes from Step 107 to Step 108, so that the image data transmitted from the digital camera 10 is received. The image data is transferred to the memory 25, and is stored in the recording medium 26, in Step 109.

In Step 110, it is judged whether the predetermined number of photographic operations have been completed, or it is judged whether the photography has been carried out by the number set in Step 102. When the predetermined number of photographic operations have not been completed, the process goes back to Step 103 to execute the operations described above.

Namely, in Step 103, an exposure compensation value, next to the previous exposure compensation value, is calculated. When Step 103 is executed for the second time, the exposure setting step 2.0 Ev is subtracted from the initial value 0.0 Ev, so that −2.0 Ev is obtained.

Step 104 and the following Steps are then executed, so that the exposure compensation value setting command and the shutter release command are sent to the digital camera 10, as described above. Thus, image data obtained by the digital camera 10 is transmitted to the memory 25, and is stored in the recording medium 26.

In the third execution of Step 103, the exposure setting step 2.0 Ev is added to the initial value 0.0 Ev, so that +2.0 Ev is obtained, and Steps 104 though 110 are then executed. Further, in the fourth execution of Step 103, double the exposure setting step of 2.0 Ev is subtracted from the initial value 0.0 Ev, so that −4.0 Ev is obtained, and Steps 104 through 110 are then executed. In the fifth execution of Step 103, +4.0 Ev is obtained, and Steps 104 through 110 are executed. Namely, in the embodiment, in a single bracket exposure in the digital camera 10, a batch processing is carried out, in which the exposure compensation value setting command and the shutter release command are transmitted the number of times that the photographic operations are carried out.

Thus, in Step 103, the exposure compensation values are obtained in the order of 0.0 Ev, −2.0 Ev, +2.0 Ev, −4.0 Ev, +4.0 Ev, −6.0 Ev, +6.0 Ev, −8.0 Ev, and +8.0 Ev. When the exposure compensation value exceeds the potential range, Step 111 is executed, in which a warning that shows the digital camera cannot perform a photographing operation, is indicated on the display 23.

Figure 4:
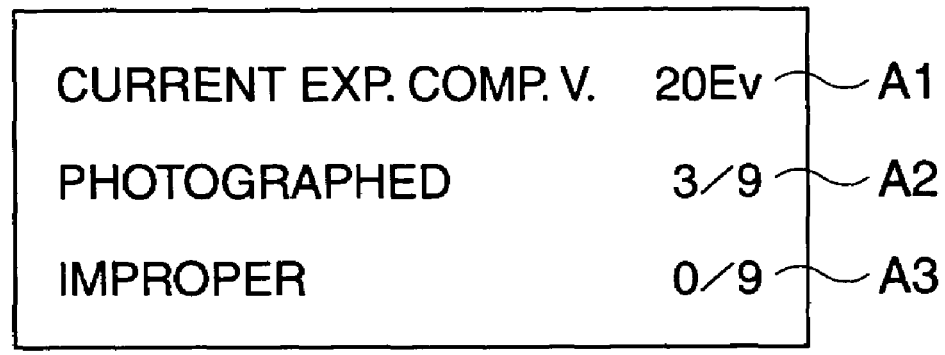
FIG. 4 is an example of contents indicated in Step 103 shown in FIG. 3.
Figure 5:
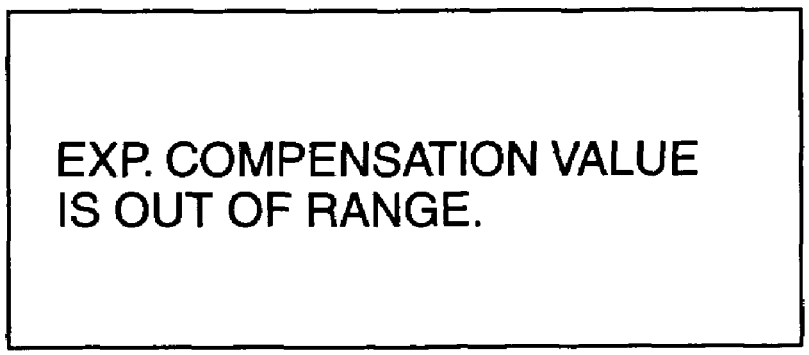
FIG. 5 is an example of a warning indicated in Step 111 shown in FIG. 3.

FIG. 4 shows an example of the contents indicated in Step 103. Reference "A1" shows the exposure compensation value, which is set at that time, reference A2" shows the number of frames, which have already been photographed, and reference "A3" shows the number of frames, in which the exposure compensation values are improper. FIG. 5 shows an example of the contents indicated in Step 111, or a warning reading that the exposure compensation value is out of available range (12.0 Ev, for example), and thus the photographing operation is impossible.

Note that, when Tv or Av obtained by the digital camera 10 is out of the available range, i.e., when Av=1.2 is obtained while the limit value of Av is 2.8, for example, the photographing operation is performed using the limit value Av=2.8. Then, in Step 208, a notice reading that Tv or Av is out of available range is transmitted to the personal computer 20, so that a notice is indicated on the display 23.

As described above, in the expanded bracket exposure of the embodiment, exposure compensation values can be used that are broader than those which can be set when the digital camera 10 is used independently, without a computer. Therefore, it is possible to avoid a situation where the proper exposure of the CCD cannot be performed because of too small an exposure compensation value, and therefore, a proper exposure can always be performed. Further, although only three pictures are photographed in a normal bracket exposure, more than three pictures can be photographed according to the expanded bracket exposure. Namely, according to the settings in the exposure compensation step, and the number of photographic operations, nine pictures can be photographed, for example.

Note that the order of change of the exposure compensation values in the bracket exposure, is not restricted to the center value, the negative compensation 1, the positive compensation 1, the negative compensation 2, the positive compensation 2, etc., as described in the embodiment. Namely, the exposure compensation values can be simply increased from the minimum exposure value, or can be simply decreased from the maximum exposure value.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-015076 (filed on Jan. 23, 2004) which is expressly incorporated herein, by reference, in its entirety.

The invention claimed is:

1. A device for remote-control of a digital camera, in which a first range of an exposure compensation value, which can be set when independently using said digital camera, is narrower than a potential range of the exposure compensation value, which can potentially be set in said digital camera, said remote-control device comprising:

a first generating processor that generates an exposure compensation value setting command for setting the exposure compensation value to a second range, broader than said first range, said first generating processor calculating the exposure compensation value based on a number of photographs and an exposure setting step, by which the exposure compensation value is changed;

a second generating processor that generates a shutter release command for performing a shutter release operation of said digital camera; and a transmitter that transmits said exposure compensation value setting command and said shutter release command.

2. A remote-control device according to claim 1, further comprising an indicator that indicates the exposure compensation value.

3. A remote-control device according to claim 1, further comprising a warning processor which warns that the digital camera cannot perform a photographing operation, when the exposure compensation value calculated by said first generating processor exceed said potential range.

4. A remote-control device according to claim 1, wherein said-transmitter performs a batch processing, in a single bracket exposure in the digital camera, in which said exposure compensation value setting command and said shutter release command are transmitted a number of times that the photographic operation is carried out.

5. A remote-control system for a digital camera, comprising:

a digital camera in which a first range of an exposure compensation value, which can be set when independently using said digital camera, is narrower than a potential range of the exposure compensation value, which can be potentially set in said digital camera;

a first generating processor that is provided in a computer, separate from said digital camera, to generate an exposure compensation value setting command for setting the exposure compensation value to a value in a second range, broader than said first range, said first generating processor calculating the exposure compensation value based on a number of photographs and an exposure setting step, by which the exposure compensation value is changed;

a second generating processor that is provided in said computer to generate a shutter release command for performing a shutter release operation of said digital camera; and a transmitter that is provided in said computer to transmit said exposure compensation value setting command and said shutter release command.

6. A recording medium, in which a program is recorded for performing an expanded bracket exposure in a digital camera, in which a first range of an exposure compensation value, which can be set when independently using said digital camera, is narrower than a potential range of the exposure compensation value, which can potentially be set in said digital camera, said program comprising:

generating an exposure compensation value setting command for setting the exposure compensation value to a second range, broader than said first range, the exposure compensation value being calculated based on a number of photographs and an exposure setting step, by which the exposure compensation value is changed;

generating a shutter release command for performing a shutter release operation of said digital camera; and transmitting said exposure compensation value setting command and said shutter release command.

7. A device for controlling a digital camera, in which a first range of an exposure compensation value, which can be set when using said digital camera, is narrower than a potential range of the exposure compensation value, which can potentially be set in said digital camera, said control device comprising:

a first generating processor that generates an exposure compensation value setting command for setting the exposure compensation value to a second range, broader than said first range, said first generating processor calculating the exposure compensation value based on a number of photographs and an exposure setting step, by which the exposure compensation value is changed;

a second generating processor that generates a shutter release command for performing a shutter release operation of said digital camera; and a transmitter that transmits said exposure compensation value setting command and said shutter release command.

\* \* \* \* \*